US007976389B2

(12) United States Patent
Cannon et al.

(10) Patent No.: US 7,976,389 B2
(45) Date of Patent: Jul. 12, 2011

(54) METHOD AND APPARATUS FOR GAMING MACHINES WITH A TOURNAMENT PLAY BONUS FEATURE

(75) Inventors: Lee E. Cannon, Bozeman, MT (US); Robert Guinn, Reno, NV (US)

(73) Assignee: IGT, Reno, NV (US)

( * ) Notice: Subject to any disclaimer, the term of this patent is extended or adjusted under 35 U.S.C. 154(b) by 472 days.

(21) Appl. No.: 09/864,927

(22) Filed: May 24, 2001

(65) Prior Publication Data

US 2002/0039923 A1 Apr. 4, 2002

Related U.S. Application Data

(63) Continuation-in-part of application No. 09/675,829, filed on Sep. 29, 2000, now abandoned.

(51) Int. Cl.
*A63F 13/00* (2006.01)

(52) U.S. Cl. ................................ 463/42; 463/23; 463/20

(58) Field of Classification Search .............. 463/40–42, 463/12–23, 25–29, 1; 273/138.1, 138.2, 273/139, 292, 143 R; 235/380, 382; 340/232 R; 364/410.1, 411.1, 412.1; 700/90–93; 705/39
See application file for complete search history.

(56) References Cited

U.S. PATENT DOCUMENTS 4,114,882 A * 9/1978 Mau .................................. 463/3
4,339,798 A 7/1982 Hedges et al. ................ 364/412
4,373,727 A * 2/1983 Hooker et al. ............ 273/143 R
4,440,036 A * 4/1984 Hooker et al. .................. 74/153
4,508,345 A * 4/1985 Okada ....................... 273/143 R
4,582,324 A 4/1986 Koza et al.
4,669,731 A 6/1987 Clarke .......................... 273/143
4,679,143 A 7/1987 Hagiwara
4,695,053 A 9/1987 Vazquez, Jr. et al. ......... 273/143
4,817,951 A 4/1989 Crouch et al.
4,837,728 A 6/1989 Barrie et al.
4,856,787 A 8/1989 Itkis
4,871,171 A 10/1989 Rivero
5,083,271 A 1/1992 Thacher et al.
5,152,529 A 10/1992 Okada
5,186,460 A 2/1993 Fongeallaz et al.
5,242,163 A 9/1993 Fulton
5,265,874 A 11/1993 Dickinson et al.
(Continued)

FOREIGN PATENT DOCUMENTS

AU 2007237214 12/2007
(Continued)

OTHER PUBLICATIONS

Take Your Pick, Strictly Slots (Mar. 2001).

(Continued)

*Primary Examiner* — Peter DungBa Vo
*Assistant Examiner* — Jeffrey Wong
(74) *Attorney, Agent, or Firm* — Weaver Austin Villeneuve & Sampson LLP

(57) ABSTRACT

A tournament gaming system is disclosed including one or more gaming machines programmed for play of at least one tournament game. A plurality of gaming machines may be linked for tournament play, as through a host computer. Qualification for tournament play may be, at least in part, effectuated through participation in one or more primary games at a gaming machine programmed for tournament play. Tournament games may be conducted at a predetermined minimum rate of play. Variable rates of play responsive to specific game outcomes during tournament games are also disclosed.

11 Claims, 4 Drawing Sheets

U.S. PATENT DOCUMENTS

| | | | | | |
|---|---|---|---|---|---|
| 5,275,400 | A | | 1/1994 | Weingardt et al. | |
| 5,288,081 | A | | 2/1994 | Breeding | |
| 5,290,033 | A | | 3/1994 | Bittner et al. | |
| 5,393,057 | A | | 2/1995 | Marnell, II | |
| 5,397,125 | A | | 3/1995 | Adams | |
| 5,417,430 | A | | 5/1995 | Breeding | |
| 5,472,197 | A | * | 12/1995 | Gwiasda et al. | 273/143 R |
| 5,544,892 | A | | 8/1996 | Breeding | |
| 5,560,603 | A | | 10/1996 | Seelig et al. | |
| 5,564,701 | A | | 10/1996 | Dettor | |
| 5,580,309 | A | | 12/1996 | Piechowiak et al. | 463/16 |
| 5,611,730 | A | | 3/1997 | Weiss | |
| 5,645,486 | A | | 7/1997 | Nagao et al. | 463/27 |
| 5,655,961 | A | | 8/1997 | Acres et al. | |
| 4,856,787 | A | | 9/1997 | Itkis | |
| 5,664,998 | A | | 9/1997 | Seelig et al. | |
| 5,711,715 | A | | 1/1998 | Ringo et al. | |
| 5,755,621 | A | | 5/1998 | Marks et al. | |
| 5,758,875 | A | * | 6/1998 | Giacalone, Jr. | 273/143 R |
| 5,761,647 | A | | 6/1998 | Boushy | |
| 5,769,422 | A | * | 6/1998 | Stromer | 273/274 |
| 5,769,716 | A | | 6/1998 | Saffari et al. | |
| 5,779,242 | A | | 7/1998 | Kaufmann | |
| 5,779,544 | A | | 7/1998 | Seelig et al. | |
| 5,779,549 | A | | 7/1998 | Walker et al. | |
| 5,806,045 | A | | 9/1998 | Biorge et al. | |
| 5,816,918 | A | | 10/1998 | Kelly et al. | |
| 5,820,460 | A | | 10/1998 | Fulton | |
| 5,823,874 | A | | 10/1998 | Adams | 463/17 |
| 5,833,536 | A | | 11/1998 | Davids et al. | |
| 5,851,148 | A | | 12/1998 | Brune et al. | |
| D404,436 | S | | 1/1999 | McGahn et al. | |
| 5,855,515 | A | | 1/1999 | Pease et al. | |
| 5,876,284 | A | | 3/1999 | Acres et al. | |
| 5,902,184 | A | | 5/1999 | Bennett | |
| 5,902,983 | A | | 5/1999 | Crevelt et al. | |
| 5,911,418 | A | | 6/1999 | Adams | |
| 5,919,088 | A | | 7/1999 | Weiss | 463/9 |
| 5,924,927 | A | | 7/1999 | Matsuura et al. | |
| 5,935,000 | A | | 8/1999 | Sanchez, III et al. | 463/17 |
| 5,941,772 | A | | 8/1999 | Paige | 463/20 |
| 5,947,820 | A | | 9/1999 | Morro et al. | |
| 5,951,397 | A | | 9/1999 | Dickinson | |
| 5,976,015 | A | | 11/1999 | Seelig et al. | 463/6 |
| 5,980,384 | A | | 11/1999 | Barrie | |
| 5,993,316 | A | | 11/1999 | Coyle et al. | 463/25 |
| 5,997,400 | A | | 12/1999 | Seelig et al. | |
| 6,012,982 | A | | 1/2000 | Piechowiak et al. | |
| 6,012,983 | A | | 1/2000 | Walker et al. | |
| 6,015,344 | A | | 1/2000 | Kelly et al. | |
| 6,019,374 | A | | 2/2000 | Breeding | |
| 6,039,648 | A | | 3/2000 | Guinn et al. | |
| 6,077,162 | A | | 6/2000 | Weiss | |
| 6,082,887 | A | | 7/2000 | Feuer et al. | |
| 6,089,975 | A | | 7/2000 | Dunn | |
| 6,089,976 | A | | 7/2000 | Schneider et al. | |
| 6,102,400 | A | | 8/2000 | Scott et al. | |
| 6,110,043 | A | | 8/2000 | Olsen | 463/27 |
| 6,113,098 | A | | 9/2000 | Adams | 273/143 |
| 6,120,378 | A | | 9/2000 | Moody et al. | |
| 6,128,550 | A | | 10/2000 | Heidel et al. | 700/232 |
| 6,135,885 | A | * | 10/2000 | Lermusiaux | 463/20 |
| 6,146,273 | A | | 11/2000 | Olsen | |
| 6,155,925 | A | | 12/2000 | Giobbi et al. | |
| 6,159,095 | A | | 12/2000 | Frohm et al. | |
| 6,159,097 | A | | 12/2000 | Gura | |
| 6,165,071 | A | | 12/2000 | Weiss | |
| 6,165,072 | A | | 12/2000 | Davis et al. | 463/29 |
| 6,168,521 | B1 | | 1/2001 | Luciano et al. | 463/18 |
| 6,179,711 | B1 | | 1/2001 | Yoseloff | |
| 6,186,893 | B1 | | 2/2001 | Walker et al. | 463/20 |
| 6,190,255 | B1 | | 2/2001 | Thomas et al. | |
| 6,193,606 | B1 | | 2/2001 | Walker et al. | |
| 6,203,010 | B1 | | 3/2001 | Jorasch et al. | 273/138.1 |
| 6,206,782 | B1 | | 3/2001 | Walker et al. | 463/25 |
| 6,210,275 | B1 | | 4/2001 | Olsen | |
| 6,210,277 | B1 | | 4/2001 | Stefan | 463/27 |
| 6,224,482 | B1 | | 5/2001 | Bennett | 463/20 |
| 6,224,484 | B1 | | 5/2001 | Okuda et al. | 463/27 |
| 6,224,486 | B1 | | 5/2001 | Walker et al. | |
| 6,231,445 | B1 | | 5/2001 | Acres | 463/42 |
| 6,238,287 | B1 | | 5/2001 | Komori et al. | 463/20 |
| 6,254,483 | B1 | * | 7/2001 | Acres | 463/26 |
| 6,287,202 | B1 | * | 9/2001 | Pascal et al. | 463/42 |
| 6,309,299 | B1 | | 10/2001 | Weiss | 463/20 |
| 6,309,307 | B1 | | 10/2001 | Krause et al. | |
| 6,315,662 | B1 | * | 11/2001 | Jorasch et al. | 463/20 |
| 6,364,765 | B1 | | 4/2002 | Walker et al. | |
| 6,368,218 | B2 | * | 4/2002 | Angell, Jr. | 463/40 |
| 6,375,567 | B1 | | 4/2002 | Acres | |
| 6,425,828 | B2 | | 7/2002 | Walker et al. | 463/42 |
| 6,508,709 | B1 | | 1/2003 | Kamarkar | |
| 6,572,471 | B1 | * | 6/2003 | Bennett | 463/16 |
| 6,605,001 | B1 | | 8/2003 | Tarantino | |
| 7,824,267 | B2 | | 11/2010 | Cannon et al. | |
| 2001/0055990 | A1 | * | 12/2001 | Acres | 463/25 |
| 2002/0039923 | A1 | | 4/2002 | Cannon et al. | |
| 2002/0177483 | A1 | | 11/2002 | Cannon | |
| 2003/0060264 | A1 | | 3/2003 | Chilton et al. | 463/20 |
| 2003/0130041 | A1 | * | 7/2003 | Pascal et al. | 463/42 |
| 2005/0148380 | A1 | | 7/2005 | Cannon et al. | |
| 2005/0181856 | A1 | | 8/2005 | Cannon et al. | |

FOREIGN PATENT DOCUMENTS

| | | | | |
|---|---|---|---|---|
| EP | 609970 | | | 8/1994 |
| EP | 0609970 | A2 | * | 10/1994 |
| EP | 0874337 | | | 10/1998 |
| EP | 0945837 | | | 9/1999 |
| EP | 0984407 | | | 3/2000 |
| WO | WO 98/00210 | | | 1/1998 |
| WO | WO-98/00210 | | * | 1/1998 |
| WO | WO 00/20082 | | | 4/2000 |
| WO | WO 02/27676 | | | 4/2002 |
| WO | WO 02/094399 | | | 11/2002 |
| WO | WO 02/096528 | | | 12/2002 |

OTHER PUBLICATIONS

Instant Sloto, Strictly Slots (Apr. 2001).

EZ-Pay and Related Brochures, IGT (2000).

Player Tracking and Related Brochures, IGT (at least 2001).

Raining Diamonds Advertisement, Sierra Design Group (2001).

Silver Strike Advertisement and Pictures, Anchor Gaming (1997).

Simon & Schuster, Scarne's New Complete Guide to Gambling (USA, 1974).

Australia Examination Report dated Mar. 24, 2006, from Australian Application No. 2001294751.

U.S. Office Action mailed May 22, 2008 from U.S. Appl. No. 11/055,354.

U.S. Office Action from U.S. Appl. No. 11/055,354 dated Oct. 16, 2008.

Australian Examination Report dated Feb. 12, 2009 from AU Application No. 2007237214.

Final US Office Action mailed Jul. 8, 2010 from U.S. Appl. No. 11/055,534.

U.S. Advisory Action mailed Jan. 13, 2009 from U.S. Appl. No. 11/055,534.

U.S. Office Action mailed Feb. 20, 2009 from U.S. Appl. No. 11/055,534.

Final U.S. Office Action mailed Aug. 27, 2009 from U.S. Appl. No. 11/055,354.

U.S. Office Action mailed Jan. 26, 2010 from U.S. Appl. No. 11/055,354.

US Office Action dated Aug. 27, 2002 issued in U.S. Appl. No. 09/675,829.

US Notice of Abandonment and Interview Summary dated Mar. 12, 2003 issued in U.S. Appl. No. 09/675,829.

US Office Action dated Dec. 30, 2004 issued in U.S. Appl. No. 10/867,940.

US Notice of Abandonment dated Oct. 4, 2005 issued in U.S. Appl. No. 10/867,940.

US Office Action dated Mar. 23, 2009 issued in U.S. Appl. No. 11/093,325.
US Office Action Final dated Oct. 27, 2009 issued in U.S. Appl. No. 11/093,325.
US Advisory Action dated Jan. 6, 2010 issued in U.S. Appl. No. 11/093,325.
US Notice of Allowance dated Sep. 17, 2010 issued in U.S. Appl. No. 11/093,325.
PCT International Preliminary Examination Report dated May 7, 2003 issued in PCT/US01/30138 (WO 02/027676).

* cited by examiner

METHOD AND APPARATUS FOR GAMING MACHINES WITH A TOURNAMENT PLAY BONUS FEATURE

RELATED APPLICATIONS

This application is a continuation-in-part of U.S. application Ser. No. 09/675,829, filed on Sep. 29, 2000 now abandoned, entitled "Method And Apparatus For Gaming Machines With A Tournament Play Bonus Feature," and which is expressly incorporated herein by reference in its entirety.

BACKGROUND OF THE INVENTION

1. Field of the Invention

The present invention relates generally to gaming system designs including a tournament feature. More particularly, the present invention may include a gaming system having two or more electronic or electromechanical gaming machines in common communication, the gaming machines providing each player an opportunity to enter and play a tournament game at each player's current location rather than at another, specific location designated for tournament play. A player may qualify for entry into a tournament in various ways, such as, for example, through achieving predetermined combinations of elements or scores on the gaming machine in a single base or primary game or in multiple games over time, wagering a predetermined amount or at a predetermined rate, or collecting a predetermined number of tournament entry points from play of primary games. Participation in a tournament after qualification may be, at the player's option, deferred until a later time.

2. State of the Art

Electronic games and their methods and apparatus for use are also well known in the art. Electronic games include games of chance, games of skill, and games involving both skill and chance. Examples of several patents describing games of chance include U.S. Pat. No. 5,833,536 to Davids et al. (Nov. 10, 1998), the disclosure of which is hereby incorporated herein by reference, U.S. Pat. No. 5,769,716 to Saffari et al. (Jun. 23, 1998), U.S. Pat. No. 5,820,460 to Fulton (Oct. 13, 1998) and U.S. Pat. No. 5,947,820 to Morro et al. (Sep. 7, 1999).

FIG. 1 is a block diagram of an exemplary electronic game 200 as found in the art. An electronic game 200 typically includes a microprocessor or other computer 204 having a central processing unit ("CPU") 206 and memory 208. The computer may be coupled to a number of peripheral devices, such as, by example only, a display screen 210 (e.g., a cathode ray tube ("CRT"), plasma display, liquid crystal display ("LCD"), and/or a display based on light-emitting diodes ("LED")) possibly having a touchscreen input 212 (see U.S. Pat. No. 5,951,397 to Dickinson (Sep. 14, 1999)), and/or buttons, keys or other user input devices 214. Preferably, a coin, currency or card acceptor device 216 (to accept a credit card, gaming card, smart card and the like) permits a player to activate a game play or place wagers. The electronic game may also include a separate scoreboard display 218.

Electronic games may also be coupled to one or more other computers such as a central computer 220 of a casino, e.g., via a network card 222 and link 224, modem 226 and the like. The game parameters 228, such as how, when and where particular images will appear on the display screen 210, how the game works and how to operate the various elements operably coupled to the computer 204, are stored in the memory 208. The electronic game 200 may be housed in a game housing

202 such as, by example only, those shown in U.S. Pat. Nos. 5,820,460 to Fulton (Oct. 13, 1998) and Des. 404,436 to McGahn et al. (Jan. 19, 1999).

Initiating an electronic game can be done as simply as by inserting a coin or, more comprehensively, for example, by inserting an identification card, such as a "smart card" having a programmed microchip or a magnetic strip coded with a player's identification and credit totals. See U.S. Pat. No. 5,265,874 to Dickinson et al. (Nov. 30, 1993), the disclosure of which is hereby incorporated herein by reference. U.S. Pat. No. 5,806,045 to Biorge et al. (Sep. 8, 1998) uses a writeable identification card, such as a smart card, to eliminate the need for a network or direct connection between remote systems and a common controller or point database. Promotional point and credit information may be retrieved, recorded and updated using the smart card. Alternatively, it is known to transfer money to a game through an electronic funds transfer as described in U.S. Pat. No. 5,902,983 to Crevelt et al. (May 11, 1999).

Existing electronic game displays typically include multiple images representing various aspects of a game such as a game portion, a credit total portion and a wager amount portion. Other electronic game displays include an additional bonus award portion to indicate an amount of a bonus award which may be won, typically through multiple games. See U.S. Pat. Nos. 5,851,148 to Burne et al. (Dec. 22, 1998) and 5,911,418 to Adams (Jun. 15, 1999).

The Internet also includes casino or game host sites offering displays similar to those found in conventional electronic games. Generally, to play an Internet game, a software file is downloaded to a player's computer or terminal, which may then be used to install the necessary software for the game and/or access the casino or game host Internet site. As with a conventional electronic game, Internet electronic games may be accessed using an identification code or name to identify a specific player and retrieve that player's credit total or play history.

Gaming tournaments, conventional methods and the operation of which are well known to those of ordinary skill in the art, are typically held by casinos at specified times, in designated areas within the casino to which a group of gaming machines has been moved for the purpose of conducting a tournament, and for specified durations. Tournament players are conventionally required to pay an entry fee to enter the tournament, although no wagers are made during the tournament. The accumulated points totals for successful tournament play, although couched in monetary terms, do not generally comprise the amounts of the actual prizes awarded. Accordingly, the "money" won is not actually paid out, but tournament players with the highest accrued totals of "money" at the end of the tournament are the winners. These winners may be conventionally awarded a percentage of the entry fees, or other prizes, by the sponsor or sponsors of the tournament.

One example of a gaming tournament system and method of entering a gaming tournament is disclosed in U.S. Pat. No. 6,019,374 to Breeding. The Breeding patent discloses a playing card wagering game to be played at predetermined tournament card game tables during a specified time. In the Breeding patent card game, players place a wager and are then permitted to place a second wager and entry fee for the opportunity to participate in a tournament game. In one embodiment, for example, players may elect to pay a $1 entry fee per hand to participate in the tournament. If a player pays the entry fee and gets a straight or better, the player's hand is eligible and may qualify the player for the second round of the tournament during a second predetermined time if the player's hand is in the top one hundred eligible hands obtained during the specified tournament time. For the tournament disclosed in the Breeding patent, there are five tournament rounds. At each round, the number of players eligible for a succeeding round is reduced and play continues until only five players are left in the final round. The players are then ranked by the total amounts accumulated in the final round and awards paid accordingly from a super jackpot total. See also, U.S. Pat. Nos. 5,288,081, 5,417,430 and 5,544,892, all to Breeding.

Although conventional tournament opportunities encourage protracted gaming and add variety to a player's gaming experience, administration of conventional gaming tournaments is time consuming and relatively expensive. As a result, tournament play is offered only at particular times and places most convenient for the tournament coordinators to allow sufficient time for tournament organization activities such as qualifying participants, sectioning off a portion of the casino, rearranging gaming machine or table locations, and the like.

U.S. Pat. No. 5,083,271 to Thacher et al. discloses a method of tracking tournaments for electronic games in which scores achieved on the games are transmitted to one or a hierarchy of computers, which determine a winner or winners. Player codes are stored in association with player credits. The players insert credit cards into the gaming machines, which read the player codes, send the codes to a computer which verifies each player's identity and enables the gaming machines. The disclosure of U.S. Pat. No. 5,083,271 is hereby incorporated herein by reference.

U.S. Pat. No. 5,242,163 to Fulton discloses the linking of a plurality of gaming machines to a "control station" to at least announce commencement of play of a secondary, group-oriented game to players at distributed gaming machines normally used for play of another, individually oriented game, such as stud poker. The invention of the '163 patent is specifically disclosed in the context of providing the opportunity for individual players to participate in a bingo game without leaving their gaming machines. The bingo game may be conducted manually, using a bingo card secured to the gaming machine, or may be conducted through the gaming machine itself, linked to the control station.

U.S. Pat. No. 6,039,648 to Guinn et al. discloses the linking of a plurality of gaming machines to a host computer so that gaming machines at distributed locations may be employed in tournament play. The disclosure of U.S. Pat. No. 6,039,648 is hereby incorporated herein by reference.

PCT International Application Number WO 98/00210 ("the '210 Application") discloses a method of tournament gaming wherein a plurality of slot machine gaming terminals is selectively networked together with a host terminal so that current players of the slot machine terminals may be notified of an opportunity to participate in group tournament play. A player receiving the notification may choose to enter the tournament, for example, by depositing a specified tournament entry fee. The '210 Application discloses that when a tournament begins, the tournament participants will push the "spin" button as fast as possible, and without the deposit of additional money, in order to earn as many points as possible. Participants in the tournament are disclosed to play for a fixed period of time, with the winner selected as the player who accumulates the largest number of points during that fixed time period.

While the concept of linking distributed gaming machines to facilitate initiation of group-oriented gaming from the distributed gaming machines has thus been recognized, it would be desirable to provide a tournament gaming system which is easily initiated and invites qualification for tournament play through enhanced participation in a base or primary game by a player located at a gaming machine convertible for tournament play.

Furthermore, in tournament games of fixed duration, part of the excitement of a tournament is the frenzy of playing the particular game as fast as possible. Under these circumstances, however, a player's contribution to an expected payback percentage from the tournament is substantially dependent upon the number of games the player initiates within the tournament time frame and, thus, may be highly variable for each single player within a group of participating tournament players. This wide range of expected payback percentage may be considered undesirable from a player acceptance standpoint and, additionally, may be disallowed in some gaming jurisdictions. Accordingly, it would be further desirable to lessen the potential for wide variations in expected payback percentages resulting from tournament play and enhance the competitiveness of tournament play.

BRIEF SUMMARY OF THE INVENTION

The present invention relates to a method and apparatus for gaming machines including a tournament play bonus feature. The gaming machines of the present invention are each configured having the features of a conventional gaming machine but include additional features relating to tournament play, which features allow a player to participate in a gaming tournament from a gaming machine configured according to the invention regardless of the geographical location of the gaming machine.

According to one embodiment of the invention, a tournament event feature is incorporated within a traditional video or mechanical reel gaming machine in addition to a base or primary game. Play at a plurality of such gaming machines is computer-monitored centrally through a network system. Play of primary or base games at the plurality of gaming machines may be employed to fund payouts for a tournament enabled for play by qualified players at linked gaming machines. Thus, no separate entry fee or buy in for tournament play may be required.

The linked gaming machines are provided with features which "qualify" players into a scheduled, linked, tournament event through attainment of one or more game outcome events. Numerous methods may be employed for entering a tournament. A player may enter or be entered in a tournament in response to an outcome of a single, primary game, such as obtaining a particular winning combination or other specific game outcome deserving of a bonus in the form of tournament entry. In an alternative embodiment, a player may accrue numbers of tournament bonus credits responsive to an outcome of one or more primary games and use the tournament bonus credits, alone or in combination with tendered monetary credits, as an entry fee to gain entry into a tournament.

Upon qualifying for entry into tournaments of fixed duration, a method of tournament gaming is disclosed wherein tournament gaming devices are configured for two modes of play for one or more games of chance, the term "games of chance" as used herein encompassing games which may include an element of player skill. The first mode of play is player-initiated and represents the maximum rate of play permitted by the gaming device. The second mode of play is automated and represents the minimum rate of play permitted by the gaming device. According to one aspect of this embodiment, the automated minimum rate of play is activated when a tournament player does not initiate a tournament game within a predetermined interval of time. Preferably, the automated minimum rate of play will be a percentage of an average or standard rate of tournament play which is typical of players participating in the particular tournament game. The standard rate of play may be preset in the read-only memory of a tournament gaming device microprocessor, or may be ascertained by sampling the rates of play of other gaming devices participating in a given tournament.

In another aspect of this embodiment, gaming devices in tournament mode may be configured, during all or part of a tournament period, to auto-play at a given rate for a predetermined period of time. In this embodiment, the auto-play of the gaming devices may be interrupted by relatively shorter periods of time in which game initiation is effected only through physical interaction by tournament players on their respective machines.

In a related embodiment, a method of lessening the variance between numbers of games played during fixed periods of tournament gaming is disclosed. The method comprises providing tournament gaming devices adapted for tournament play and configured to automatically initiate a tournament game of chance upon the expiration of a predetermined time interval without interaction from a tournament player. Further according to the embodiment, tournament players are permitted to initiate play of each tournament game prior to the expiration of a predetermined time interval. If a player does not so initiate play within the requisite time interval, however, the gaming devices will automatically initiate play of the tournament game.

In yet another related embodiment of the invention, a method of tournament gaming is disclosed in which a plurality of tournament gaming devices is configured to allow variable rates of play during a tournament of fixed duration. According to this embodiment, a tournament player begins play of a game of chance at a first permitted rate of play, which rate of play changes to a second permitted rate of play in response to one or more selected game outcomes. The second permitted rate of play may be faster or slower than the "normally" permitted rate of tournament play. The variable rate of play will typically continue for a fixed interval of time and/or until one or more second "deactivating" outcomes or particular combinations appear on the player's gaming device. It is further contemplated that a game outcome or other event associated with one of the gaming devices linked for tournament play may, due to the network connecting same, be used to trigger a change to the rate of play on all of the gaming devices in play for that tournament.

In tournament play according to a still further embodiment of the invention, each linked gaming machine generates game results and accumulates tournament points based on tournament game outcomes. The linked gaming machines each report to a central monitoring computer, which may be termed a "tournament controller," which determines if each player meets criteria for an additional payout. Depending upon game outcomes in tournament play and the number of participants, payout awards are established and displayed.

Gaming machines for carrying out the above-mentioned tournament gaming methods are also disclosed herein.

Various combinations of the aforementioned aspects of this invention are described further in detail hereafter. As one of ordinary skill in the art will understand, numerous combinations of these aspects are possible, and those provided are for illustrative and exemplary purposes only and are not in any way limiting of the present invention.

BRIEF DESCRIPTION OF THE SEVERAL VIEWS OF THE DRAWINGS

The nature of the present invention as well as other embodiments of the present invention may be more clearly understood by reference to the following detailed description of the invention, to the appended claims, and to the several drawings herein, wherein:

DETAILED DESCRIPTION OF THE INVENTION

Figure 1:
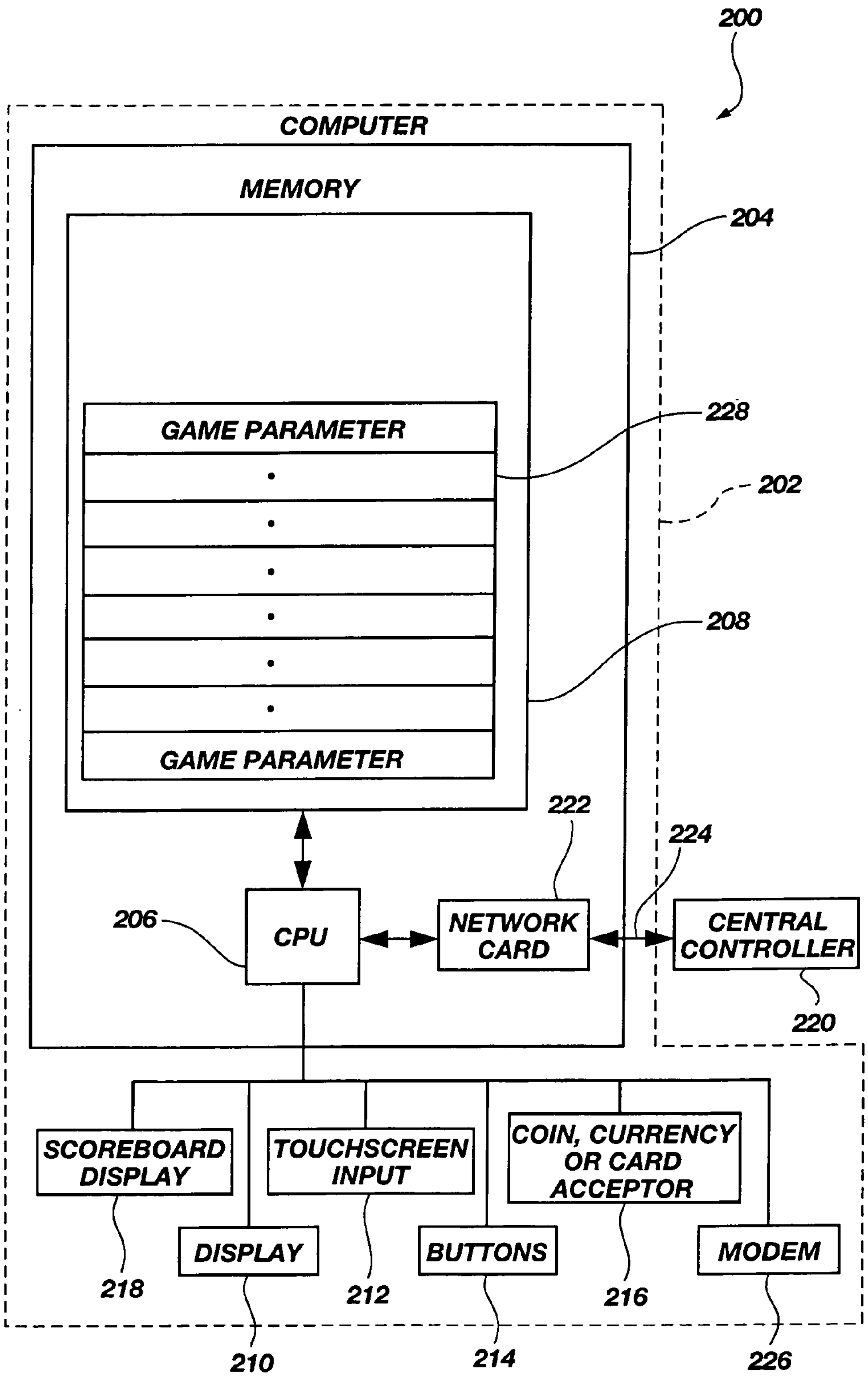
Fig. 1 (PRIOR ART)
FIG. 1 is a schematic of a conventional, prior art electronic gaming machine.
Figure 2:
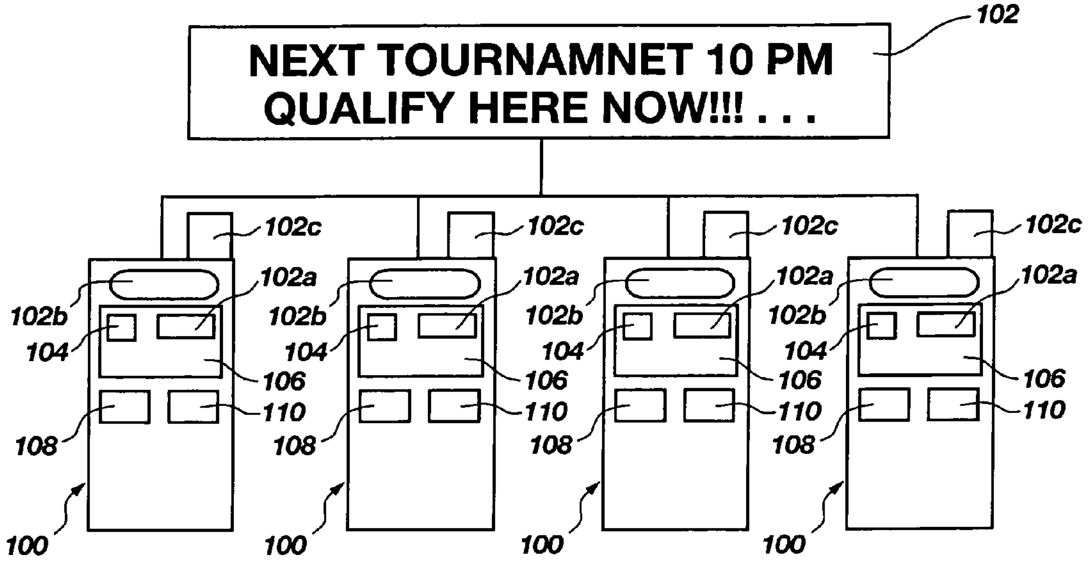
FIG. 2 is a diagram of a plurality of gaming machines arranged in a bank and having a tournament display associated therewith according to the invention.

According to an embodiment of the present invention and as described with respect to FIG. 2, a bank of gaming machines 100 is in communication with a tournament display 102 located thereabove. Gaming machines 100 may include some or all of the features of conventional gaming machines 200 as described above with respect to FIG. 1, modified and augmented as set forth herein.

When the tournament mode of play of the gaming machines 100 is inactive, the tournament display 102 is programmed to show promotional information regarding impending tournaments. The base, or primary, game on each of gaming machines 100 may be, for example, a multiline, five-reel spinning reel game, either electromechanical with actual moving reels or electronic with simulated reels and movement thereof, the game awarding prizes when specified numbers, types and configurations of symbols, also termed "elements," occur on a winning payline or are otherwise visibly displayed in a winning pattern. Alternatively, the primary game may comprise any other reel-type game, card game, or other game of chance (including, as noted above, those games requiring or inviting an element of player skill) susceptible to representation in an electronic or electromechanical form.

In any case, a special symbol or element on one or more of the reels (or otherwise displayable if other than a reel-type game), sometimes referred to herein for convenience as a "tournament symbol", may be associated with entry into a tournament. For each symbol that appears on a winning payline or other predetermined display location, one or more tournament entry points, also termed "tournament bonus credits" herein, may be accumulated in a "pool meter" programmed to accrue tournament bonus credits toward eventual qualification for tournament play. By way of example only, tournament bonus credits or entry points may accrue as a multiplier of a bet on a winning payline of a reel-type game. When a predetermined number of bonus tournament points has accrued in the pool meter associated with a particular gaming machine, the player at that machine is then tournament-qualified.

When a predetermined period of time has passed, for example, twenty minutes, any players then being qualified for tournament play are queried through a dialog box 104 on each display screen 106 or otherwise readily visible to the player on the face of each gaming machine 100 as to whether they wish to enter the next tournament. Alternatively, the players may be automatically entered in the next tournament and advised of such entry through the dialog box 104 and, optionally, an audio signal (trumpet blast, bells, music, etc.). In any case, when the player is entered in the tournament, the entry points or tournament bonus credits required for entry to that tournament are deducted from the accrued pool of points or credits at the gaming machine 100, which enters a tournament mode shortly before commencement of a tournament. If desired, a countdown clock may be provided on display screen 106 to prompt the player to a state of readiness for tournament play during the last two minutes, for example, prior to initiation of a tournament. The gaming machines 100 of the bank of machines may be programmed to enter a single or first tournament mode, or may be programmed to enter one of several different tournament modes as dictated by the casino or tournament sponsor. For example, a second or grand tournament mode may be opened on a daily basis, only to players who are identified as prior winners of tournaments conducted in the first tournament mode. Another alternative is to periodically, or when desired, open certain tournaments to gaming machines in other banks on the casino premises (such as all banks in a casino) or in other casinos (such as in affiliated casinos), or gaming machines located in a single city (Las Vegas, Reno) or statewide (Nevada), such as in a wide area progressive format. A series of tournaments may be conducted to enable players to attain a very high tournament point total associated with a very large top tournament award, so as to stimulate player interest in frequent qualification for tournament play. Of course, the grand tournament concept may be combined with the linked banks of machines concept so that, for example, tournament winners throughout the state of Nevada on a given day are entered in a grand tournament at 10 P.M. each evening. Further, the foregoing linked gaming machine concept is not limited to banks, or groups of machines, but may be effectuated by linking gaming machines distributed through a single property such as a casino or a number of properties. With state of the art video displays and accompanying audio, the look and feel of "group" tournament play may be readily simulated at individual machines not grouped as a bank.

It is currently preferred that gaming machines 100 according to the invention include video displays rather than electromechanical displays to facilitate transitioning from a base or primary game to one or more tournament games. In the illustrated embodiment, the game displayed on gaming machines 100 in at least one tournament mode is similar to the primary game but with certain differences to distinguish it therefrom. For example, if the primary game is the aforementioned five-reel game displayed electronically on a video screen, the tournament game may also comprise a five-reel display using different reel symbols and distinguishing surrounding graphics. In addition, the payback rate or payout ratio may be the same as that of the primary game or much higher, such as, for example, in excess of one hundred percent. The previously referenced tournament symbol may also be displayed on the reels during tournament play, in this instance to be used, for example, as an award enhancer. Play in the tournament mode neither deducts wager credits from or adds award credits to the credit meter 108 on each gaming machine 100 entered in the tournament. Instead, and again by way of example only, the tournament mode runs in an all-paylines-bet mode and posts awards earned in tournament play to a special tournament points meter display 110. If desired, the credit meter 108 may also be used as the tournament points meter display while a tournament is being conducted, the credit meter total being accessible/responsive to a player prompt such as a touch pad for triggering the credit display momentarily rather than tournament points. The tournament may have a specified duration, for example, ten minutes, conclude when the first tournament player reaches a designated tournament point award threshold, or conclude after a specified duration even if no player has reached the designated threshold so as to free the gaming machines for regular, nontournament play.

During tournament play, the player's tournament points are, as previously noted, displayed on tournament points meter display 110 at his or her gaming machine 100. At the end of a given tournament, the winner or winners are determined and their winnings posted back to the credit meter 108 at each winner's gaming machine 100, unless a progressive jackpot is offered, as described further below, in which instance the award may be paid by an attendant.

Tournament awards may be structured, for example, as a plurality of fixed prizes. Each prize is associated with a tournament point threshold; the greater the prize, the higher the associated points threshold. There may also be a token prize awarded to every entrant, or for a nominal tournament point total, so that substantially every entrant wins something.

Optionally, and as referenced above, the top tournament award may comprise a progressive jackpot. The progressive jackpot is established at a desirable level and is augmented with every tournament session played until it is won. If multiple players reach the threshold level for the progressive jackpot in the same tournament, then the jackpot may be split equally among them, or the entire progressive jackpot awarded to the first player to reach same.

In addition to the foregoing tournament awards, a winner-take-all pool, funded by a percentage of the entry points of each entrant into the tournament, may be provided. If so, the player accruing the greatest amount of tournament points during tournament play is awarded the winner-take-all pool.

When a tournament is ready to commence, players having at least twice the required tournament bonus credits or entry points may be provided with the option to place a single tournament entry or multiple entries. If the latter is chosen, the fixed awards and the winner-take-all pool, if offered, are multiplied by the number of entries placed if that player wins an award. If a progressive jackpot is offered, the progressive award is not multiplied by the number of entries by a given player but, instead, if there are multiple progressive winners, a player with multiple entries wins multiple shares of the progressive, equivalent to the number of entries. For example, if there are three progressive winners but one winner has placed two entries, that player receives two shares instead of one, or one-half the progressive award.

The tournament display 102 may be used for various purposes before and during tournament play. For example, the available awards and their associated tournament point thresholds or other conditions may be displayed between and during tournaments. As a tournament is running, the current tournament leaders as well as a countdown clock with remaining tournament time may be displayed. For example, the accrued points for the players accruing the most tournament points (for example, the top five players) may be displayed on the tournament display 102 in substantially real time to show current tournament status against the clock.

Depending upon the locations of gaming machines configured for tournament play according to the present invention, a tournament display 102 may comprise one or more separate devices apart from the gaming machines 100 or, optionally, may be incorporated into each machine in addition to or in lieu of a separate, discrete tournament display. For example, the tournament display 102 may comprise a segment 102*a* of a main game display screen 106 or comprise either a separate display 102*b* built into the chassis of the gaming machine 100 or an add-on display 102*c*. Display of promotional information for the tournament may be optionally displayed while the tournament is not running, as may the time or times of subsequent tournaments. Similarly, accrued tournament entry points or bonus credits may or may not be displayed between tournaments, and accrued tournament points and/or player standings may or may not be displayed during tournaments.

According to one currently preferred embodiment of the invention, a tournament event feature is incorporated within a traditional video reel-type gaming machine in addition to a base or primary game. Play at a plurality of gaming machines, which may be distributed over a wide variety of locations at the same or different properties, is linked to and monitored by one or more computers, optionally including a dedicated tournament controller, through a network system. Play of primary or base games at the plurality of gaming machines is employed to fund payouts for a tournament enabled for play by qualified players at linked gaming machines (i.e., a predetermined percentage of bets tendered at the gaming machines in primary game play is allocated for tournament payouts). No separate entry fee or buy in for tournament play is employed.

The linked gaming machines are provided with features which "qualify" players into a scheduled, linked tournament event. Tournament qualification is enabled by attaining one or more game outcome events, such as lining up special symbols or accumulation of game results to meet one or more threshold criteria. Normally, a player may qualify into the next-in-time scheduled, linked tournament event. However, a player may be provided the option, once qualification parameters are met, to defer tournament play to a future tournament event in certain circumstances. By way of example only, a player may not have sufficient time available to wait for the next-in-time tournament, or has insufficient time to stay through the duration of the upcoming tournament. Such may be the situation in the case of a bus junket to a tournament, where players only have a finite time during which to play. In such instances, a tournament-qualified player may be provided the option of printing a tournament entry ticket from the gaming machine at which he or she qualified that allows the player to return to a linked gaming machine to participate in a future tournament session.

In tournament play according to this embodiment of the invention, each linked gaming machine generates game results based on a fixed number of reel spins associated with the duration of the tournament. The reel spins are part of a secondary event within the main game (i.e., the primary game) comprising the aforementioned video or mechanical reel machine. During a tournament session or event, the secondary event accumulates tournament points based on reel combination outcomes. The accumulated tournament points for each player may be displayed at his or her gaming machine in real time. Optionally, the accumulated tournament points for all players at a bank of gaming machines during a tournament session may be displayed on a tournament display associated with the bank or on each gaming machine. If the tournament is comprised of play at gaming machines distributed throughout different areas of a property or even different properties in the same or different town or county, for example, rather than consolidated with a bank of machines, only an individual player's accumulated tournament points total may be displayed. To stimulate a sense of tournament competition, however, a selected number of other players' accumulated tournament points may also be displayed on each gaming machine of a number of gaming machines linked for tournament play, for example, the accumulated points of the top five or ten players. Another option is to display point totals of all players in a tournament session, and yet another option is to display a particular player's points and his relative ranking among all the players in a tournament session. A multiple player points or ranking display may be displayed in real time, at intervals (for example, every three minutes), or at the conclusion of a tournament session.

At the end of a tournament event, the linked gaming machines may each report to a central monitoring computer, such as the aforementioned tournament controller. The tournament controller then determines if each player meets criteria for an additional payout in the form of a progressive amount accumulated from the gaming machines during play of primary games or other additional awards based on accumulation of previous bets tendered at all linked gaming machines. Depending upon game outcomes in tournament play and the number of participants, payout awards are established and displayed on each gaming machine or through meter displays associated with a bank of gaming machines.

A number of payout options are contemplated for the first embodiment of the invention. For example, a standard progressive format may be employed, wherein each player who earns tournament points above a predetermined threshold is paid from the progressive pool funded from the primary game wagers. Another alternative is to tally the total buy-in for a given tournament and spread top tournament awards among entrants to the tournament, thus guaranteeing a fixed percentage of payout to those qualified entrants participating in that tournament. Still another alternative payout approach is to set a fixed amount for all awards triggered for tournament point accrual above a predetermined threshold and a pool for a top award given to the player with the highest point accumulation for that particular tournament session.

If desired, the fixed tournament awards may be set at multiple levels tied to tiered tournament point levels. This may be effectuated by generation of the payout schedule by the tournament controller and transmission thereof back to the linked gaming machines after registration of all players for a tournament session. Such an approach permits the winning pool to fluctuate, an increased number of participants in a given tournament enabling higher as well as more numerous payout awards.

This embodiment of the invention may also incorporate a linked progressive wherein the very highest award is triggered by attaining an extremely high value of points during linked tournament play. This top progressive award may be set to correspond to a tournament point total requiring several rounds of tournament play before being paid out. Such a progressive may be enabled through a wide area progressive (WAP), multi-property linked progressive which may reach very large top payout amounts, thus attracting greater interest for players in qualifying into the linked tournament events.

As noted previously, the present invention may be implemented with a bank of gaming machines at a single location, or to gaming machines in multiple banks or otherwise distributed over a wide area, either within a single property or at multiple sites. A stand-alone gaming machine may also be configured for play in a tournament mode according to the present invention.

While it has been suggested previously that the tournament game be the same as, or similar to, the primary game, it will also be understood by those of ordinary skill in the art that the tournament game may be totally different than the primary game. For example, the primary game may be selected to be a reel-type game, while the tournament game may be selected to be a card game (poker, blackjack, etc.).

There are many alternative approaches to qualification for tournament play according to the invention. Typically and desirably, qualification for tournament play may be related to a game outcome of the primary or base game. For example, a winning outcome of a single game might result in one or more tournament entries or, as noted above and currently preferred by the inventors herein, winning outcomes may be programmed to contribute tournament bonus credits or entry points accrued on a pool meter against a specified threshold requirement for tournament entry. Other alternatives include basing tournament entry on cumulative amounts wagered, such as, for example, over a predetermined period of time, or the number of qualifying primary games played. In any of the foregoing instances, the gaming machine may be programmed to either clear tournament bonus credits or entry points if the player leaves the machine or, alternatively, be banked to permit additions thereto during future play. Of course, known player identification and "tracking" techniques as previously described herein with respect to the state of the art may be employed to enable a player to "transport" earned tournament bonus credits or entry points to later augment by play of a primary game at the same or another similarly configured gaming machine.

One or more of a plurality of criteria may be selected to initiate tournament play, including initiation at regular intervals (trigger a tournament one-half hour after conclusion of the last), according to a specific schedule (every hour on the half hour), according to the number of qualified players (when fifty players accrue sufficient entry points), or randomly throughout the day. On a stand-alone gaming machine, tournament play may be automatically initiated when entry criteria, such as accrual of sufficient tournament entry points, are met.

As noted above, a player may be automatically entered in a tournament when qualified, or may be permitted to accrue additional tournament entry points, for example, to place multiple entries in a single, subsequent tournament.

If a multiple entry format is permitted in tournament rules, such may be effectuated in various ways. One approach may be to program a gaming machine to display multiple games, each, for example, being a miniaturized video display of the tournament game. If multiple entries for a single game entry are permitted, then the tournament awards may be adjusted to reflect the multiple entries. This approach might involve enhancing the award amounts for multiple entries or, conversely, adjusting tournament point thresholds or other award-triggering criteria in favor of the multiple entrant. Yet another approach is to adjust the tournament game itself to accommodate multiple entries. For example, different award amounts may be provided, different reel strips displayed in the case of a reel-type game or a different card set offered in the case of a card-based tournament game, or multiple entrants may play for award categories different than single entrants. The additional award categories may be fashioned in a manner similar to a well-known concept termed "buy a pay." Still another approach to accommodating multiple game entries in an advantageous yet fair manner is to offer a multiple entrant additional tournament play time during which to accrue tournament points or meet other winning criteria. Finally, a casino or other tournament sponsor might provide a sum of free tournament points responsive to a player placing multiple entries. Of course, combinations of various of the foregoing features may be effectuated, as desired, to enhance the entertainment value of the tournament for multiple-entry players.

Of course, if multiple entries are not part of the planned tournament game structure, then the player who "overaccrues" tournament entry points or bonus credits might be accommodated by being permitted to bank the excess points or credits against future tournaments or might be paid in cash or monetary credits for the excess, or the points may simply be forfeited.

Similarly, one must consider the situation when a player, for any reason, wishes to leave a gaming machine when there are tournament entry points or bonus credits on the pool meter which have not been used to enter a tournament or a tournament entry not placed with them, or if there are simply not enough points to qualify for tournament play. These tournament entry points or bonus credits might be left on the gaming machine for the next player, converted to a cash award, tendered as credits in the primary game to either qualify for a tournament or cash award or lost, or the machine may simply be reset to zero upon the player's departure.

Once initiated, a tournament may be of fixed or variable duration and based upon playing a specific number of games or "wagering" a specific number of "credits.". For example, the duration of tournament play may be determined by the players being allowed to play off a specific, assigned number of "credits" in the form of "funny money" provided for tournament play for a given session. These "credits" are not augmented by "points" won during tournament play. This approach permits players to vary wagers during tournament play or to use some wagering strategy, whether real or perceived, in tournament play. With a format involving either a number of games played or a number of credits provided to wager, there may, of course, be an overriding factor in terms of limiting a tournament to a set duration of time. It is also specifically contemplated that a variable-duration tournament may be ended when a first player in the tournament obtains a given point level in tournament play, or when a player in the tournament obtains some certain, predetermined game outcome.

In tournaments of fixed duration, tournament awards will typically be correlated to the point total a player earns during the tournament period. In one embodiment of the present invention involving tournaments, gaming machines in the tournament bonus mode will be programmed to automatically initiate the tournament game at a predetermined minimum rate. Preferably, the predetermined minimum rate will be less than the maximum rate of play which can be initiated through the physical interaction of an average player (i.e., the fastest rate at which a "hypothetical average player" or other "modeled" player could initiate a game by pressing a "spin" or "play" button). Thus, for purposes of enhanced player interaction and the excitement of frenzied play, this embodiment of the present invention allows a player to attempt to initiate a game as soon as circuitry within the gaming machine permits through resetting of the gaming machine circuitry for initiation of game play after conclusion of play of the next-previous game. However, in cases where the player is distracted, physically unable to initiate a game as quickly as might be desired, or simply desiring of allowing the game to play automatically, the gaming machine will automatically initiate a new game in tournament play mode if no player interaction occurs within a given time interval during the tournament period.

With minimum and maximum rates of play readily determinable, the relative percentage of games played through automatic initiation within a given time period on any given tournament gaming device can thus be set to lie within a range bounded by lower and upper thresholds with respect to the average number of games played on all gaming devices involved in the tournament. Preferably, the minimum "auto-play rate" will be selected from a play rate ranging from about 70% to about 95% of the average play rate for the "hypothetical average player," although various other play rates are contemplated, including automated play at the fastest possible rate permitted. As used herein, the average play rate for the "hypothetical average player" may also be referred to as the "standard play rate." More preferably, the minimum auto-play rate will range from about 85% to about 90% of the standard play rate in order to provide a stimulus for players to play at a faster rate while providing a "floor" play rate which is not too disadvantageous. Using this approach, variance in game hold percentage and thus payout percentage to the players participating in the bonus, tournament round may be more closely predicted (i.e., a game hold percentage of, for example, between 89% and 92%) and ongoing compliance with government regulations regarding minimum payout percentages ensured.

The minimum auto-play rate, representing a percentage of the standard play rate derived from a percentage of the hypothetical play rate of an average player, may be preset in the read-only-memory (ROM) of a gaming device microprocessor or, alternatively, may be ascertained on an on-going basis by sampling rates of play from gaming devices linked in the tournament network in real time during a given tournament or accumulated as historic data over a number of tournaments. In the latter instance, rate of play may be accumulated in an absolute sense wherein an average tournament play rate of each new tournament played is added to modify an existing computed play rate, or a running average may be computed wherein, for example, only the average play rates during the ten most recent tournaments are used for the computation.

In the aspect where sampling of linked tournament devices occurs, a central controlling computer networked to each gaming device may perform the sampling and periodically send minimum rate-of-play instructions to linked gaming devices used in the tournament mode. The sampling may take place at a plurality of time intervals during the tournament. Thus, the invention contemplates that the automated minimum rate of play may be varied as a result of each sampling. At the start of the tournament and in the time period before any sampling has occurred, the minimum auto-play rate may be established by a default setting programmed in ROM associated with the microprocessor of the gaming device or within the central controlling computer. In this case, the default setting establishes an interim minimum auto-rate of play until such time as new rate-of-play instructions are received. As the tournament progresses, sampling of the gaming devices being used in tournament play may then be conducted at, for example, one minute intervals, two minute intervals, etc.

In a related aspect of this embodiment, a tournament player may be provided with information displayed on his or her gaming device relating to that player's rate of play, including the player's average number of spins per a given time period, and/or their relative rate and/or relative ranking in rate of play as compared to other tournament players in the tournament under way.

As would be recognized by one skilled in the art, the predetermined minimum rate-of-play feature lessens the potential for wide variations in payback percentages expected during a tournament or bonus round, thus increasing player satisfaction in addition to satisfying the regulations of certain gaming jurisdictions. One skilled in the art will also recognize that the embodiment may be used in tournaments of various scales, including "personal tournaments" (i.e., a tournament in which a player is not competing against other players).

Figure 3:
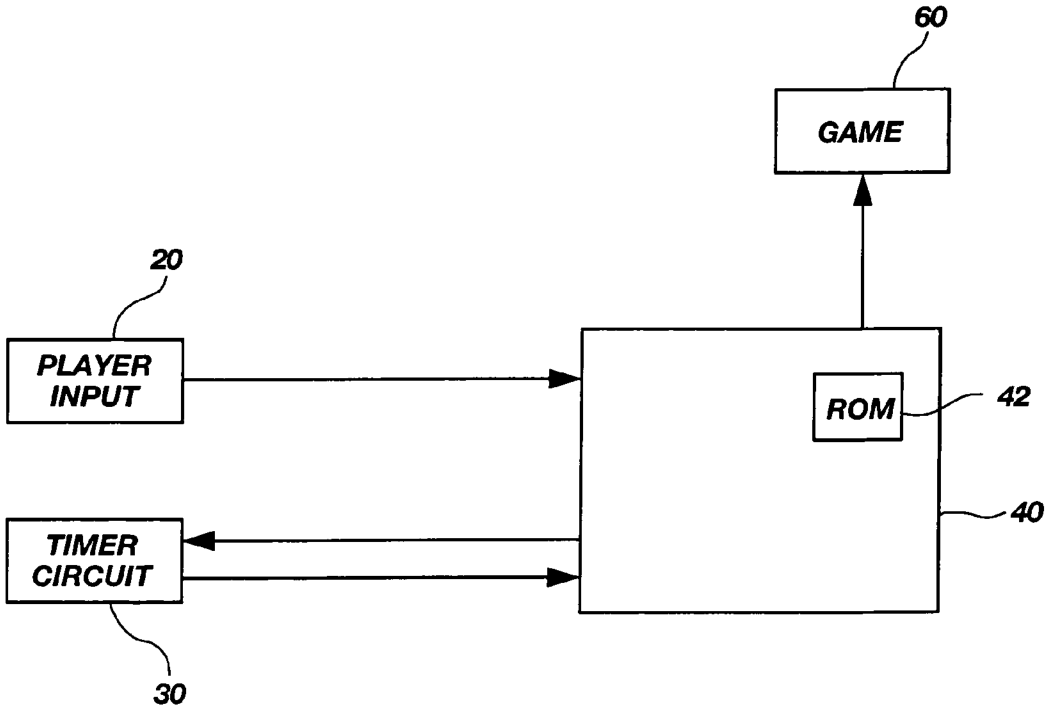
FIG. 3 is a schematic diagram of a gaming device configuration permitting a variance in the rate of tournament play.

With reference to FIG. 3, the predetermined minimum play rate embodiments of the present invention may be implemented, for example, by means of a player input switch 20 and optional timer circuit 30 linked to a microprocessor 40 controlling operation of the gaming device. Alternatively, the timing function to automatically activate play of a game 60 within a certain interval after completion of a prior game 60 may simply be implemented through appropriate software as known to those of ordinary skill in the art. It should be noted that the software approach may be used to facilitate changes in minimum play rate and fine tuning of this feature based on empirical, sensed rates of play. Thus, gaming machines 100 linked to a central controller 302 (FIG. 4) may be reprogrammed for different minimum rates of play for different tournaments, or to change a minimum rate of play during a tournament based on feedback from the gaming machines 100 to central controller 302.

In an embodiment using a timer circuit 30, microprocessor 40, which receives play rate instructions stored in associated ROM 42, is programmed to initiate timer circuit 30 upon the start of the tournament and upon the conclusion and reset for subsequent play of each game 60 within a tournament. Once timer circuit 30 is activated, microprocessor 40 evaluates data from timer circuit 30 against a maximum permitted time interval between conclusion of play of a tournament game 60 and initiation of a subsequent play thereof. If a player does not initiate play of a new game 60 within a predetermined time interval dictated by the play rate parameters programmed into ROM 42, microprocessor 40 generates a signal to activate playoff a new game 60. The automatic play of the gaming device is superseded, however, if a player initiates play of a game 60 by activation of player input switch 20 (e.g., the player presses a "spin" or "play" button) prior to the expiration of the predetermined time interval. In that case, microprocessor 40 sends a signal responsive to the player input to switch 20 for the game 60 to operate immediately. Upon conclusion of the immediately preceding game 60 and if time is left in the tournament period, microprocessor 40 will reset and activate timer circuit 30. Timer circuit 30 may be deactivated by microprocessor 40 while the gaming machine is in conventional gaming (i.e., for play of a primary game), rather than tournament use In a related embodiment, gaming devices in tournament mode may be configured, during all or part of a tournament period, to auto-play at a given rate for a predetermined or random amount of time, which auto-play is interrupted by relatively shorter time periods in which the gaming devices allow game initiation through frenzied physical interaction by tournament players. In this embodiment, players may be inspired to watch attentively as their gaming device plays in automatic mode while waiting for an opportunity to "impact and increase point totals" at a play rate which is relatively greater than that of the machine in automatic mode. The periods in which player-initiated interaction may occur can be announced, for example, by flashing lights, a trumpet blast, a message box on the gaming device, an intercom announcement directed to tournament players, and the like. In this embodiment, tournament players may be made aware that a specified number or range of "player interaction periods" will occur over a fixed time period. The player interaction periods will preferably occur randomly during the tournament timeframe, and will be activated on all tournament gaming devices simultaneously by way of a network-linked central controller (computer). Alternatively, the players may be made aware of impending periods of player interaction, such as by a "count-down to play" displayed on a peripherally located tournament screen, or on a display located on their respective gaming devices. This embodiment of the present invention advantageously heightens player anticipation and excitement, thus leading to added enjoyment and interest in the game.

In a still further embodiment relating to the rate of play on a tournament gaming device, one or more specific outcomes on a game or one or more particular "winning combinations" may be used to lead to a bonus situation in which a tournament player is allowed (permitted) to play at a rate relatively faster than that normally permitted by gaming device circuitry in tournament play. To take advantage of the increased rate of play in what might be termed a "turbocharged" version of tournament play, a player is permitted, for example, to physically activate a new game by pressing the "spin" or "play" button sooner than the time interval otherwise allowed in "normal" tournament play. The faster, accelerated rate of play can be realized, for example, by reducing the time interval between the display of the game outcome on the gaming device and the availability of the gaming device for the initiation of a new game. Upon attainment of the designated specific outcome(s) or "winning combination(s)" in a game or series of games during the tournament, the player will preferably be notified of the opportunity for the increased rate of play. In another variation of this embodiment, the gaming device may be programmed to self-initiate an accelerated auto-play mode wherein the gaming device itself will initiate new games faster than possible by any player. The period in which the increased rate of play is permitted will typically continue for a fixed interval of time and/or until a second "deactivating" outcome or particular combination appears on the player's gaming device. The period for an accelerated rate of play may be measured in terms of time (minutes, seconds) or in the number of games which may be initiated during a given period.

Of course, a player may not choose to take advantage of the opportunity for an increased rate of play, in which case the gaming device will preferably default to auto-play at predetermined intervals. Alternatively, the gaming device may be configured to simply respond to whatever player input the tournament player may provide with the auto-play feature deactivated.

In another aspect of the subject embodiment, a player may receive an outcome or combination which results in a rate of play relatively slower than the rate of tournament play normally permitted. Upon notification of the slower rate of play, the player may be "motivated" to achieve a second outcome or combination which will reset the gaming device into the original rate-of-play mode. One skilled in the art will appreciate that the "increased" and/or "reduced" rates of play on a tournament gaming device may be effected, for example, by programming of specific instructions into the ROM associated with a gaming device microprocessor.

The present invention may also be implemented in an embodiment wherein an indicator is used to alert a player as to when a new game may be initiated by, for example, hitting a spin/play button on the gaming machine. A light, sound, vibration or other signal sensible by a player at a gaming machine may be used to communicate that the gaming machine is enabled for play of a new game. If the player does not act within a predetermined time interval, the new game may self-initiate. This feature may also be used to direct and maintain additional attention to game play by penalizing a player who acts too early and hits the spin/play button prematurely. For example, the player may be locked out of play of the game source to be initiated until the timing function of the gaming machine initiates play after the predetermined time interval. A further penalty may be provided, for example, in the case of repeat offenders "jumping the gun" in attempting to initiate new games before signaled to do so by restricting play rate to the minimum play rate initiated by the timing function of the gaming machine for multiple games, such as three games or five games. Alternatively, a player who repeatedly activates game play after a signal but before the timing function will self-initiate play may be rewarded with earlier signals to enable faster play.

A wide variety of tournament award types and conditions for triggering awards may be utilized, including combinations of multiple types. For example, awards may be issued against fixed conditions, independent of results achieved by other tournament players. Alternatively, players may mutually compete to attain the highest tournament point total. Similarly, tournament awards may comprise fixed amounts, progressive amounts, or pari-mutuel amounts. As mentioned above, multiple entries per player may be permitted, in which instance award amounts may be adjusted in various ways to ensure fairness to the multiple-entry player. As noted above, tournament awards may be structured so as to provide for at least a nominal award for each tournament entrant, if desired. Awards may be posted to a pool meter at a player's gaming machine or, particularly in the case of larger awards, may be paid by an attendant.

Rather than setting a single tournament entry point or bonus credit total, different levels or tiers of tournaments may be contemplated. In such a case, a player may be permitted to accrue entry points beyond an initial first-tier tournament by, for example, opting-out of the first tournament qualification when first attained or when the tournament next following attainment of the required entry point total is initiated. A second-tier tournament may require a higher entry point total and thus offer larger awards.

Further, rather than structuring tiers of tournaments according to entry point totals, a casino or other tournament sponsor may structure higher or grand tournament awards, based upon the highest accrued totals of tournament points over a given period, such as a day or a week. With such an arrangement, the accrual of tournament points by a player is monitored by the player's tracking account. Another approach is to accrue tournament points by gaming machine, so that "lucky" machines would attract ever-greater play during a given period, the grand tournament award being reached by whatever player is in the "hot seat" at the machine when either a set total or a highest total among a plurality of machines linked for tournament play is reached.

There may be, of course, one or more sources of funding for a tournament. One alternative is to assign a per-tournament entry point or bonus credit value, the value to be assigned to the tournament funding pool. Another alternative is to allocate a percentage of the amounts wagered in the base or primary games used to qualify for tournament play to the tournament funding pool. Yet another alternative is to independently fund the tournament from other revenues of the venue or a sponsor associated with the venue. Again, combinations of two or more of the foregoing funding approaches may be employed, as desired. Further, the allocation of the tournament funding pool between various prizes may be effectuated in a number of well-know manners. For example, the awards may be against fixed odds, a pari-mutuel system may be employed, or a combination thereof may be employed.

Figure 4:
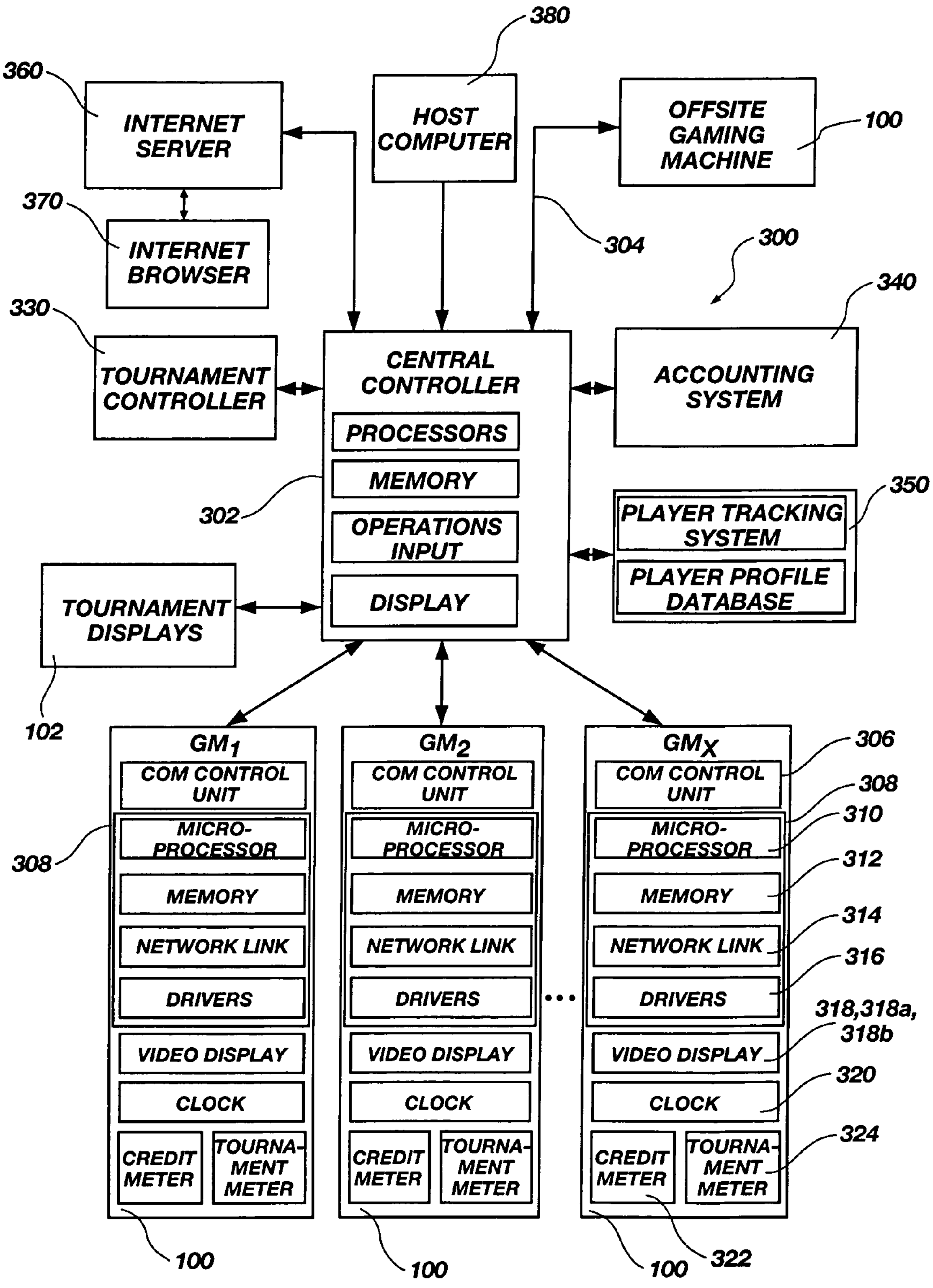
FIG. 4 is a schematic diagram of a configuration in which the plurality of gaming machines and tournament display of FIG. 2 may be incorporated in a host computer-controlled tournament gaming system according to the present invention.

FIG. 4 comprises a schematic of multiple gaming machines 100 linked to a host computer in a manner suitable for implementing a tournament according to the present invention. Tournament system 300 includes a central controller, or host computer 302, operably coupled to a plurality of gaming machines 100 designated as $GM_1$ through $GM_X$. Gaming machines 100 may comprise a single type of machine (e.g., reel-type or card game type) or multiple types of machines, or include multigame machines as known in the art. Central controller 302 links the plurality of gaming machines 100 for tournament play, among other functions, and such linkage is not restricted to gaming machines 100 at a single site, such as a single casino. Central controller 302 may optionally, through communications link 304 as known in the art, serve gaming machines distributed throughout a number of properties at different geographical locations including, for example, different locations within a city or different cities within a state. It is preferred that central controller 302 be located at the same site as tournament controller 330, although this is not required, given the current, high speed broadband capabilities of telecommunications links.

Gaming machines 100 each, for example, may include a communications control unit 306 for interfacing each gaming machine 100 with central controller 302. If the gaming machines 100 are of different types and/or of different manufacture, it may be necessary to provide gaming machine-specific interface cards in communications control unit 306.

Each gaming machine 100 also includes a game processor unit 308 operably coupled to central controller 302 through communications control unit 306. Each game processor unit 310 includes a microprocessor 310, memory 312, a network link 314 including a network card and drivers 316. The drivers 316 are, in turn, operably coupled to a video display 318, which may comprise, for example, a cathode ray tube ("CRT"), plasma display, liquid crystal display ("LCD"), and/or a display based on light-emitting diodes ("LED")), possibly including a touchscreen input function, as well as audio outputs for gaming machine 100. Audio outputs may be coordinated with a particular video display sequence, or may be separately initiated. Video display 318 may comprise a plurality of individual display segments 318*a*, 318*b*, etc., located either on a common screen display or on separate displays. Display segment 318*a* would typically comprise the game display, for example, the aforementioned five-reel game, while a display segment 318*b* may comprise a tournament display 102. Gaming machines 100 also optionally include a clock 320 for, for example, indicating through video display 318 the time remaining until a tournament begins or the time remaining in a tournament under way. Alternatively, a timing function may be provided through central controller 302, initiated by tournament controller 330. A credit meter 322 and tournament point meter 324 (for display of tournament entry points and tournament points accrued during a tournament) are also associated with each gaming machine 100. The individual components of the gaming machine as described above, or subcombinations thereof, may also be termed a "gaming device."

Tournament controller 330 is operable to initiate tournaments in an automated manner and in accordance with preprogrammed parameters. For example, tournament controller 330 may, and preferably is, programmed to schedule and initiate tournaments, control the length of same (if not concluded based on other criteria such as accrual of a threshold sum of tournament points), implement a tournament paytable or payout ratio distinct from that of a primary game, and provide information to tournament displays 102 (either on gaming machines 100 on a display segment 318*b* or on separate tournament displays 102, for example, associated with banks of gaming machines 100) both between and during tournaments as heretofore described.

It is preferable for security purposes that the overall framework of tournament play for a given tournament be installed into tournament controller 330 (for example, on a CD-ROM) under appropriate security conditions and that only certain variables not affecting payout ratios such as tournament scheduling and duration be accessible by casino operations personnel for alteration through input/output devices. Within the parameters of a payout ratio set for a tournament, it is, of course, possible to program tournament controller 330 so that casino operations personnel may adjust the number and size of tournament awards and whether, for example, a nominal award will be paid to all entrants. Similarly, the tournament controller 330 may be programmed for administration of a tournament or series of tournaments including a progressive jackpot payout, as well as to run a tournament in a pari-mutuel manner with respect to allocation of tournament funding.

Also linked to central controller 302 in real time is an accounting system 340 and a player information system 350, the two of which may be combined, as desired, in a single system. Accounting system 340 is employed to provide automated, real-time accounting for a tournament administered by tournament controller 330 through central controller 302, while player information system 350 provides stored, updated profiles of players with respect to credit status, money wagered, money won, games played, preferred games, etc., such information being updated with an integral player tracking function responsive to a player's smart card or other tracking method.

As should be clear to one of ordinary skill in the art, the foregoing description of a video display may be implemented through a single display or group of displays housed in a decorative casing or casings comprising the gaming machine chassis and coupled, directly or indirectly, to a common central controller 330 such as through a local area network ("LAN") and/or through a wide area network ("WAN"). With the tournament gaming system 300 as illustrated in FIG. 4, multiple communication lines from the central controller 330 may be coupled to each gaming machine 100 to relay and modify display data in the multiple game display windows or segments. The communication lines may include, without limitation, electronic or other data-transferring cable (including optical as well as electrical), radio frequency wave transmissions including cellular frequency transmissions as well as microwave, satellite dish frequencies, etc., phone lines (again both optical and electrical) and the like, such as is common with remote communication systems. More preferably, however, the function and displays on the gaming machines 100 may be fixed by hardware and software included within each gaming machine 100 to minimize required communication with the central controller 302. For example, gaming machines 100 may be preprogrammed with both a primary game mode and a tournament mode, whereby a signal from tournament controller 330 delivered via central controller 302 may initiate a tournament mode as desired and terminate same after, for example, a predetermined elapsed tournament duration or receipt of real-time information from at least one gaming machine 100 that a threshold sum of tournament points has been accrued.

The game display and interaction as described herein may also be implemented through an Internet or Intranet server 360 as an Internet or Intranet display to be viewed by at least one Internet browser 370. In this way, connection to a tournament and accumulation of tournament points may be accomplished with only a connection to the Internet/Intranet server 360 through a conventional phone or other data transmission line, digital signal line ("DSL"), T-1 line, coaxial cable, fiber optic cable, or other connection known in the art. It is will also be understood by those of ordinary skill in the art that enhanced bandwidth of digital wireless communications may render such technology suitable for some or all communications according to the present invention, particularly if such communications are encrypted. It will be further understood and appreciated by those of ordinary skill in the art that higher data transmission speeds may be useful for enhancing the sophistication and response of the display and interaction with the player. Even in an Internet embodiment, the game display may be housed in a decorative housing. One advantage to this embodiment, however, is that players may access an Internet game page from any location where an Internet connection and computer, or other Internet facilitator such as the so-called "WebTV" boxes, are available. The expansion in the number of computers and number and speed of Internet connections in recent years increases opportunities for players to play from an ever-increasing number of remote sites.

Central controller 302 may also be linked to a host computer 380 at the same or another site, host computer 380 controlling, by way of example, the entire computer network of a property or group of properties or another central controller overseeing another group of tournament-capable gaming machines for operating a different type of tournament or a tournament on a different but overlapping schedule with the tournament controlled by central controller 302.

Figure 5:
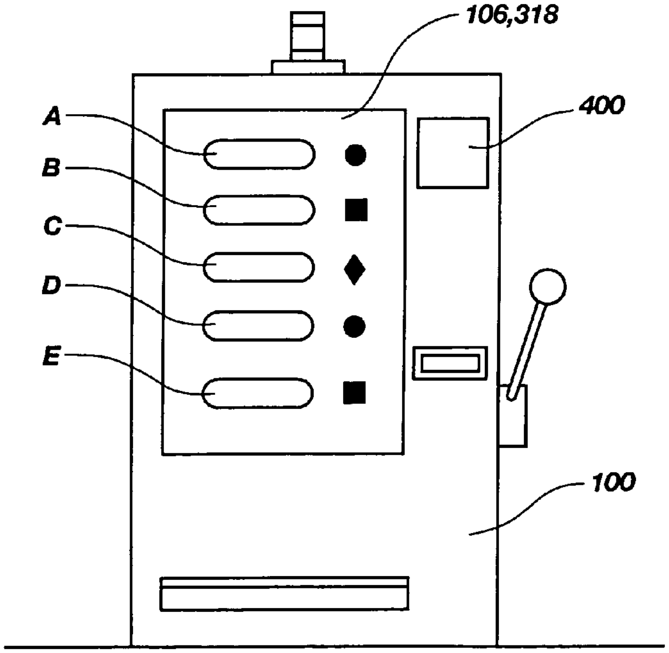
FIG. 5 is a schematic of a multigame-capable gaming machine displaying recent play history and game prize profile icons according to the invention.

In addition to other aspects of the present invention and referring to FIG. 5, a gaming machine may include a display screen or a display segment 106, 318 including a recent play history 400 for that machine. For example, one or more of the following may be displayed: length of time since last jackpot, size of last jackpot, frequency of jackpots, jackpot trends, or other win information. Depending upon a given player's personality and preferences, a player might be drawn to a given gaming machine because it has not recently paid out and is thus "due to hit," or has paid out in the recent past and is thus on a "hot streak." In addition to primary game outcome information, a gaming machine display might be configured to display a tournament play history so that players might choose a gaming machine which has been "lucky" during tournament play.

Further, it is contemplated that tournament entries may be made from gaming machines exhibiting different primary games, or multiple primary games. Thus, game-specific entry point accumulation criteria associated with different types of games (for example, card games and reel-type games) may be mathematically adjusted so as to be substantially equivalent. In other words, the entry point accumulation criteria would be implemented for different games so play of one game would not be more likely to result in tournament qualification than play of another, different type of game. Such an approach lends itself to multigame machines which now merely provide the option of playing several different types of primary games. Further, and with reference again to FIG. 5, in a multigame video gaming machine, "prize profile" icons may be associated with and displayed adjacent each game name A through E on the display. Each game prize profile, such as frequent small jackpots (circle icon), fewer midrange jackpots (square icon) or still fewer large jackpots (diamond icon) is associated with a particular icon. Of course, any type of icon, such as fanciful figures associated with a theme of the casino in which the gaming machine is placed, may be employed Thus, players may quickly come to associate an icon with a type of primary game which appeals to them from a payout standpoint. Of course, the use of prize profile "icons" is readily adaptable to gaming machines lacking a tournament game feature.

The present invention has been described primarily in terms of a game or games of chance, both as to primary game play as well as to tournament game play. However, it is contemplated that the invention may be implemented with a combination of a primary game of skill and a tournament game of chance, a primary game of chance and a tournament game of skill, or a primary game of skill and a tournament game of skill. Of course, games of combined skill and chance may also be used as either or both of a primary game and a tournament game.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A method of tournament gaming, comprising:

providing a plurality of wagering gaming devices adapted for tournament play and configured to play at least one primary game of chance at variable rates of play;

initiating a tournament game of chance in a multi-player tournament on a wagering gaming device of the plurality of wagering gaming devices in response to an occurrence of one or more qualifying outcome events of the at least one primary game of chance wherein a qualifying outcome event of the at least one primary game of chance is winning the at least one primary game of chance or is based on multiple wins of the at least one primary game of chance; and playing the tournament game of chance at a first permitted rate of play as permitted by gaming device circuitry, relative to which the actual rate of game play may vary, and changing the permitted rate of play of the tournament game of chance to a second permitted rate of play as permitted by gaming device circuitry, relative to which the actual rate of game play may vary, in response to an occurrence of a specific game outcome of a plurality of game outcomes that may result when the tournament game of chance is played matching a preselected game outcome from the plurality of game outcomes wherein a time interval between the display of a game outcome is reduced when the specific game outcome is a specific winning combination such that the second permitted rate of play is faster than the first permitted rate of play.

2. The method of claim 1, wherein the second permitted rate of play reverts to the first permitted rate of play automatically in response to occurrence of at least one other game outcome.

3. The method of claim 1, wherein the second permitted rate of play reverts to the first permitted rate of play automatically in response to expiration of a predetermined interval of time.

4. The method of claim 1, wherein the second permitted rate of play reverts to the first permitted rate of play after a number of plays are initiated on the at least one wagering gaming device.

5. The method of claim 1, wherein the at least one primary game of chance is at least one of a reel-type game and a card game.

6. The method of claim 1, comprising automatically initiating play at the second permitted rate of play irrespective of player input when the second permitted rate of play is permitted.

7. The method of claim 1, comprising playing the tournament game of chance at a rate of play no less than an automated minimum rate of play.

8. The method of claim 7, comprising playing the tournament game of chance at a rate of play no less than an automated minimum rate of play when a player does not initiate play of the tournament game of chance within a predetermined time interval.

9. The method of claim 8, wherein the automated minimum rate of play comprises a percentage of a standard rate of play of the tournament game of chance.

10. The method of claim 9, comprising sampling rates of play of the tournament game of chance on at least some of the plurality of wagering gaming devices and deriving the standard rate of play from the sampling.

11. The method of claim 1, further comprising qualifying for play in the tournament game of chance by tendering a wager.

* * * * *